United States Patent [19]

Lebost

[11] 4,295,783
[45] Oct. 20, 1981

[54] FLUID TURBINE

[76] Inventor: Barry A. Lebost, 1116 Warburton Ave., Apt. 1K, Yonkers, N.Y. 10701

[21] Appl. No.: 876,217

[22] Filed: Feb. 9, 1978

[51] Int. Cl.$^3$ ............................................. F03D 1/04
[52] U.S. Cl. ................................... 415/2 R; 290/54
[58] Field of Search .................... 415/2, 3, 4; 290/54, 290/55

[56] References Cited

U.S. PATENT DOCUMENTS

| 534,167 | 2/1895 | Mathews | 415/2 X |
|---|---|---|---|
| 1,169,223 | 1/1916 | Abern | 415/2 |
| 4,017,204 | 4/1977 | Sellman | 415/2 |
| 4,031,405 | 6/1977 | Asperger | 415/2 X |
| 4,057,270 | 11/1977 | Lebost | 290/54 |
| 4,116,581 | 9/1978 | Bolie | 415/2 |

FOREIGN PATENT DOCUMENTS

| 2545951 | 4/1976 | Fed. Rep. of Germany | 415/2 |
|---|---|---|---|
| 1098995 | 8/1955 | France | 415/2 |
| 449753 | 6/1949 | Italy | 415/3 |

*Primary Examiner*—Everette A. Powell, Jr.
*Attorney, Agent, or Firm*—Thomas K. Ziegler

[57] ABSTRACT

A fluid turbine designed for increased power output including an annular housing provided with a semispherical dome for directing incoming fluid flow from a fluid source in an angular and downward direction to impinge simultaneously on a plurality of radial, horizontal, rotor blades within the housing fixed to a vertical output shaft. The simultaneous impingement of the incoming fluid on all of the rotor blades quickly overcomes the initial inertia of the blades to rotation and maintains the rotor operating at peak velocity. The housing rotates independent of and coaxial to the rotor blades so as to position its fluid entrance passage normal to the direction of fluid flow and is provided with a plurality of fluid exit passages in its base so that deenergized fluid can be flushed from the housing by the downwardly directed flow which in conjunction with a low pressure area created behind a downwardly directed frontal scoop connected to the housing, which blocks the path of flow of the ambient fluid, causes additional fluid to be continuously drawn into the housing at high velocity to impinge on the rotor blades. The housing is gyroscopically stable and prevents the rotor from cutting back into the ambient fluid, which would retard rotation, while serving as a safety shield against flying debris entrained in the fluid stream.

25 Claims, 6 Drawing Figures

FLUID TURBINE

BACKGROUND OF THE INVENTION

1. Field of the Invention

This invention relates to a fluid turbine structure which is used to generate power by exposure to wind, tidal or ocean currents.

2. Description of the Prior Art

With sources of energy, such as petroleum, natural gas and the like, being rapidly depleted throughout the world, either new sources of such energy must be found or alternative sources must be developed to fulfill the energy requirements for a highly technical society. Natural, non-polluting, inexhaustible sources of energy, such as the wind, the tides, and the ocean currents can fulfull these needs.

Many attempts have been made heretofore to convert kinetic energy in ambient wind fields or tidal currents into shaft rotational energy in either horizontal or vertical axis machines to generate power for diverse purposes. Typically, the horizontal axis machines are of the propeller type which have existed for centuries in various forms. A major drawback of the horizontal axis type machine is that the plane of blade rotation must constantly change as the wind changes direction. This is usually accomplished in practice by affixing a "tail" or vertical stabilizer to the rear of the rotor and allowing the rotational axis to pivot into the wind. This introduces undesirable gyroscopic loads and a design constraint in that the response of the machine to changes in wind direction must be sufficiently rapid to track and capture the available kinetic energy. Furthermore, the operation of such machines is highly inefficient.

For example, U.S. Pat. Nos. 2,153,523 and 2,177,801, each illustrate a horizontal axis machine which uses wind driven double impellers for simultaneously rotating the field and armature windings of an electrical generator in opposite directions to double power production. The windings of the generator are connected to coaxial shafts which are driven in opposite or counter rotation by oppositely curved wind impellers. The impellers have opposite curvatures so as to turn in opposite directions when positioned normal to the direction of the wind by a vane, "tail", or vertical stabilizer.

Twin impeller wind machines of this type have been able to provide more electrical power because of their inherent design. However, in the construction of horizontal, twin impeller wind machines, one impeller has always been placed behind the other in parallel, vertical planes. Accordingly, both impellers must get their energy from the same wind field while rotating in opposite directions causing undesirable gyroscopic forces on the machine, while causing drag of one impeller relative to the other slowing the tip velocity of the impellers and thereby creating inefficient power production. As previously stated, such a design also requires that the impellers be placed in a plane which is constantly changing as the wind direction changes and therefore must be rapid in response to changes in wind direction under the urging of the "tail" or vane.

Accordingly, in recent years, a number of vertical axis machines have been investigated as an alternative source of converting kinetic energy in ambient wind fields and tidal currents into shaft rotational energy. These include the Savonius, Darrieus and Gyromill configurations in which the impellers have taken the form of exposed air foils, sails, and paddles. These machines eliminate the problems of having to change the rotors plane of rotation and thus eliminate expensive yaw control devices. However, many of these rotor structures are inefficient because as they rotate away from the fluid source, they also must return to their starting point and therefore, must cut back into the source of fluid, which tends to retard their rotation, leading to inefficient power production.

Since the state of the art has not been satisfactory, other innovative approaches have recently been proposed. One approach has been to generate a vortical flow by introducing appropriate non-rotating structures in the flow and to attempt to capture some of the associated wind pressure energy in addition to the conversion of the ambient kinetic energy. Sforza, for example, has placed the rotational axis of a propeller type windmill coaxially with the core of a vortex generated by a delta wing at incidence to the wind, so that the turbine ingests the angular kinetic energy of the upstream vortex. Yen has investigated an alternate mode of vortex augmentation in which a confined vortex is generated in a tower, and a low-pressure core is used as a pump for a propeller type turbine flow to discharge into.

It will be appreciated from the foregoing discussion that fluid powered turbines have mainly been machines placed in fluid currents to rotate from the direct force of that current as it moves past a rotor or impeller that is connected to a power generator. Little has been done in the way of molding, shaping, directing, or increasing the velocity of the incoming fluid upon the rotor arrangement. In theory, the power available from a fluid current is proportional to the cube of the fluid current velocity. Therefore, the most powerful fluid driven machine would be one in which means are provided to increase the velocity of the arriving fluid and which is designed for maximum efficiency.

This suggests the desirability of a fluid energy machine incorporating the advantages of a vertical axis and flow-focusing housing or shroud. Ideally, only the housing would have to pivot to present the inlet to the oncoming fluid flow, thus eliminating any gyroscopic loads, as in horizontal axis machines, and greatly mitigating the problem of rapid response to wind directions shifts since the outer housing and tail could be constructed of lightweight materials and rotate relative to the rotor.

Such a device was described in detail in my prior U.S. Pat. No. 4,057,270, issued Nov. 8, 1977. The fluid turbine disclosed in that patent is characterized by increased power output and efficiency and is accomplished by providing upper and lower twin rotors which are spaced in parallel, horizontal planes so as to be subject to separate wind fields or fluid currents and, therefore, subject to independent operation. The rotor or impeller blades are not forced to cut back into the wind or fluid current as in the prior art devices, but rather the vector force of the fluid impinging on the blades and the vector force imparted by new fluid entering the rotor are complementary.

Two substantially annular, rotor housings are each provided with a plurality of radially extending blades connected to coaxial shafts. One of the shafts is connected to the field windings of an electrical generator, while the other shaft is connected to the armature windings. The radial blades in each rotor housing, when exposed to a fluid force, are adapted to rotate in opposite or counterdirections causing the field and armature windings of the generator to rotate in opposite directions to increase the power output from the generator.

A tail vane and "lazy susan" bearing connected to each housing provides means for keeping the machine pointed normal to or into the oncoming fluid. The housings rotate relative to the rotor blades thereby enabling the blades to rapidly respond to wind direction shifts.

Properly curved stator blades adjacent to the entrance to each rotor housing form a series of fluid jets which provide acceleration to the oncoming fluid and a means for directing that fluid in a manner normal to the path of rotation of the rotor blades. This has the effect of increasing the starting torque on the radial rotor blades about the annular housing of each opposite rotating rotor and once operation is commenced, to increase the available effective force of the incoming fluid current.

Directing fluid to the stator blades are two fluid scoops at 45 degree angles to the housings. The scoops placed in this manner increase the velocity of the fluid entering the entrance to each housing and stator apertures and results in increasing the force delivered upon each blade on both rotors which increases the velocity of both rotors in opposite directions and thus multiplies the power output by an extremely significant amount. New fluid passing through the stator jets formed by the stator blades will tend to recycle this fluid, changing its direction and thus adding to the force of the fluid already in the rotor housing. This increases the rotor torque. The stator jets bend the fluid from its normal position to a position aiding the internal fluid and applying pressure against the rotor blades making this internal fluid compatible with new fluid entering the housing to eliminate turbulence.

Tunnels are also mounted on the top of each rotor housing to deliver fluid to the interior of the housing and create a lower pressure area inside each housing to increase the velocity of the fluid within the housing and the pressure on the rotor blades. By use of the arrangement described, power output is available even in light fluid currents or winds, and in heavy currents power output is greatly multiplied.

While my prior device generated effective power, I have now discovered that at least the same amount of power can be generated in relatively light winds and at relatively low rotor tip velocities by the use of a single rotor structure and housing which is designed to further augment the fluid velocity impinging upon the rotor blades.

This is accomplished by the provision of an additional fluid pathway into the rotor housing for directing fluid flow from a fluid source in such a way that non-deenergized fluid will impinge upon all of the rotor blades simultaneously both during rotation and before rotation commences. In my previously patented structure, the fluid would try to travel at a quicker rate than the blades because of the internal resistance of the rotors to the initial fluid flow prior to the rotors turning. By enabling the fluid flow to impinge simultaneously on all of the rotor blades, the kinetic energy initially lost in starting the rotor rotating is captured and used, as well as providing greater turning torque on all of the blades after rotation has commenced.

This increased efficiency is obtained while providing a housing surrounding the rotor blades which is independently rotatable relative to the rotor, thereby quickly enabling the rotor to face the oncoming fluid regardless of direction, and a housing so designed as to preclude the rotor blades from turning back into the resistance of the oncoming fluid.

Additional velocity augmentation devices can also be provided on the housing, such as a downwardly directed frontal scoop which accelerates the ambient flow as it enters the housing as well as creating a low pressure area beneath the housing by blocking the flow. This low pressure area in conjunction with reflected flow provided in the housing can flush deenergized fluid from between the rotor blades out of the housing through fluid exit passages formed in the base of the housing to draw more non-deenergized fluid into the housing to impinge on the rotor blades.

The net effect of such a structure is to increase both efficiency and power output enabling a single rotor (and therefore considerably less material) to furnish the same or better power than had heretofore been realized in my counter-rotating, double rotor machine, which is of critical importance in the field. For example, the unique flow focussing structure increases the power and efficiency of the rotor above the ideal efficiency (Betz limit) of unshrouded propeller type windmills. This efficiency can be produced by the turbine of the present invention at extremely low rotor tip velocities; specifically, by comparison—at one-tenth the rotor tip velocity of the vertical Darrieus rotor with a simultaneous result of doubling the power output. This enables the turbine to achieve a higher exponential rate of power in high winds than has ever been achieved heretofore, with low maintenance due to low centrifugal forces and bearing wear.

To date wind turbines have mainly been machines utilized in rural areas. In order to introduce these machines into populated areas where the maximum energy is consumed, some kind of protective shield about the rotor must be employed to preclude the accidental loss of a rotor blade due to fatigue promoting gyroscopic and centrifugal stresses.

A contained gyroscopically stable rotor structure, elimination of fatigue centered pitch control devices, ultra slow speed operation for exponential reduction of centrifugal forces, all make the present invention ideal for use in populated areas.

SUMMARY OF THE INVENTION

In accordance with the invention, a single rotor structure is mounted on a vertical shaft. The rotor structure includes a plurality of arcuately curved blades fixed to the vertical shaft and a housing encircling the blades. The housing is adapted to rotate independent of and relative to the blades. A dual tail or vane structure extends from the housing opposite to the fluid entrance passage to the housing so as to position the fluid entrance passage in a direction substantially normal to fluid flow, such as an ambient wind field.

A scoop extends outwardly and downwardly from the fluid entrance passage to the housing for concentrating the fluid flow to impinge upon the rotor blades positioned across the fluid entrance passage to the housing. The scoop creates a venturi throat for accelerating the fluid flow so that it impinges upon the blade at increased velocity. The blades of the rotor are curved in a scoop or bucket-like shape to maximize momentum exchange with the incoming fluid stream.

The housing is provided with a semi-spherical dome which is cut away adjacent to and above the fluid entrance passage so as to enable incoming fluid to impinge upon all of the rotor blades simultaneously, both during rotation and before rotation commences. The introduction of non-deenergized fluid into all sections of the housing simultaneously allows the fully energized fluid to impinge upon all of the rotor blades simultaneously before and after rotation commences thereby overcoming any initial inertia or resistance of the rotor blades to turning and capturing the full kinetic energy of the incoming fluid.

The bottom of the rotor housing is provided with one or more fluid exits. The dome also directs the incoming fluid down onto the rotor blades and also flushes the deenergized fluid from between the blades out of the housing. The scoop blocks the ambient fluid from beneath the base of the housing and in conjunction with the flushing of the deenergized fluid from between the blades creates a drag force which generates a low pressure area at the fluid exits beneath the base, with the effect of drawing more incoming fluid into the housing to impinge upon the blades. This aids the efficiency by increasing the tip velocity of the blades.

The directing of the fluid by the dome onto each blade simultaneously during rotation provides an additional viscosity effect which increases the fluid pressure at the front of each rotor blade, thereby once again, increasing the efficiency and power output of the machine within a short span of time.

By enshrouding the rotor blades with a domed housing, the rotor blades are precluded from cutting back into the impinging fluid which would tend to retard its momentum, but yet all of the blades are provided with simultaneous impingement of the incoming fluid, which has been accelerated by the scoop, thereby increasing the overall efficiency and power output of the apparatus.

The shaft connected to the rotor blades may be used for any power generating function. For example, the shaft may be connected to the windings of a generator to generate electricity. Alternatively, the shaft may be connected to a heat brake or fluid friction device immersed in a liquid bath to heat the bath through frictional contact therewith and turbulence. The liquid may be pumped by the brake or propeller into heat exchange relation with water to be heated; for example, in a home hot water system. It has been found that the turbine of the present invention is uniquely suited to drive all pump type loads at peak power turbine output efficiency or peak power coefficient at all ambient fluid speeds making it ideal for irrigation, air compression and heat brake, heat producing applications. Because of the turbines unique pump-like physical characteristics, its high power coefficient at all ambient fluid velocities, its low rotation rate below ambient fluid velocities and its substantially perfect cubic power profile the turbine is better suited for matching pumping loads than prior art devices.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
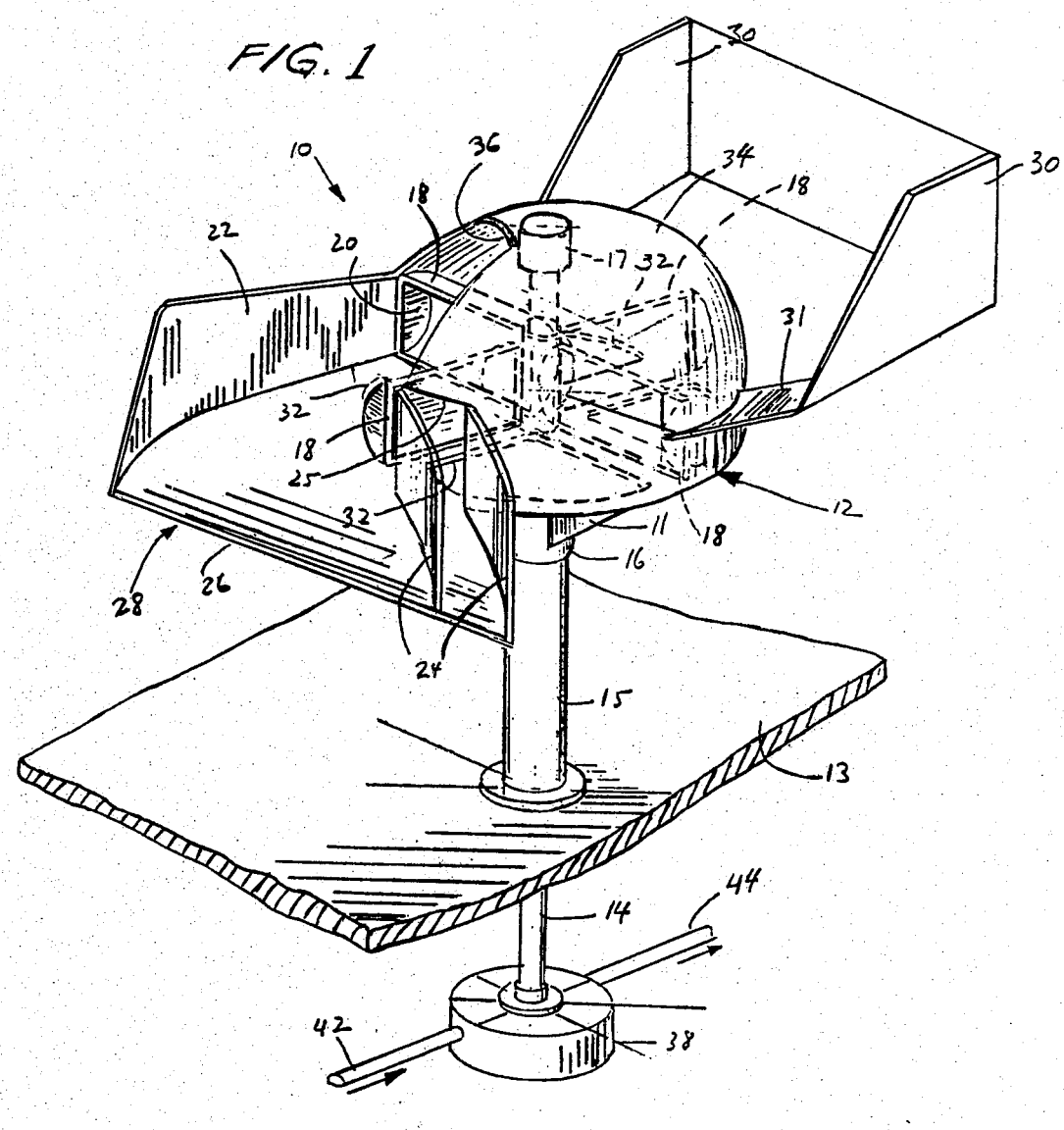
FIG. 1 is a perspective view of the fluid turbine comprising the subject matter of the present invention.
Figure 2:
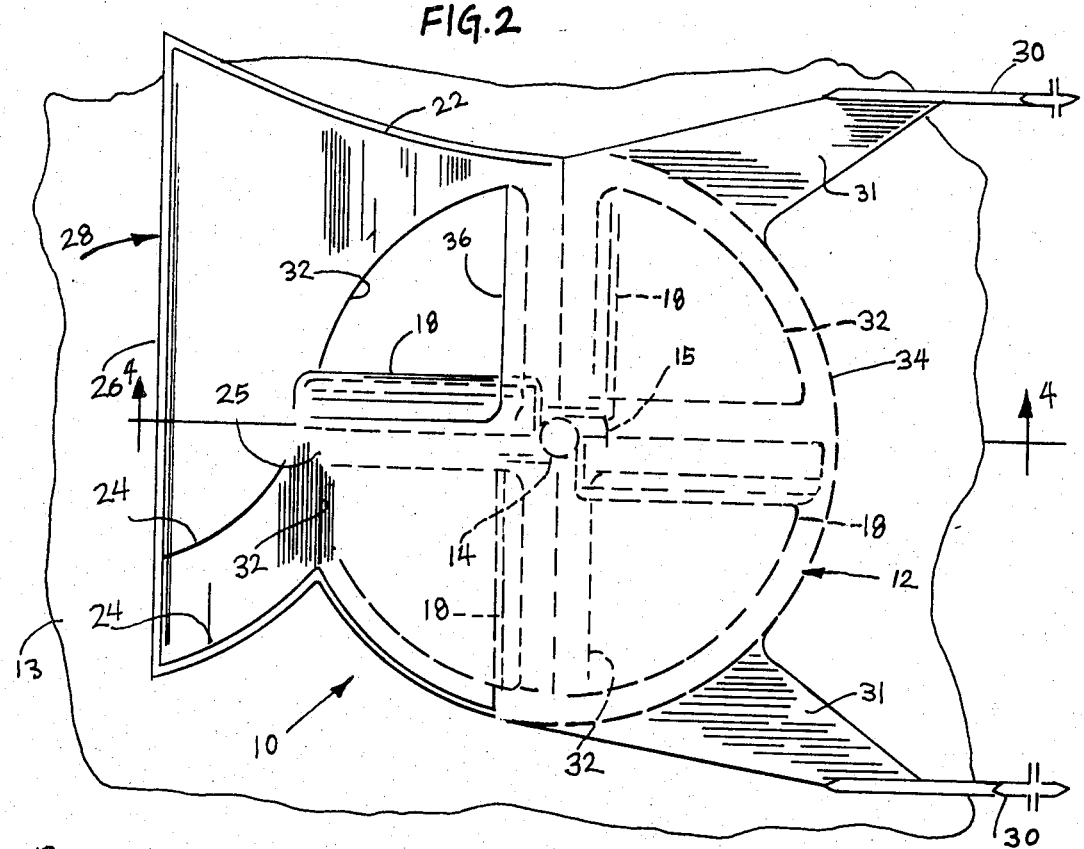
FIG. 2 is a top plan view of the fluid turbine of FIG. 1.
Figure 3:
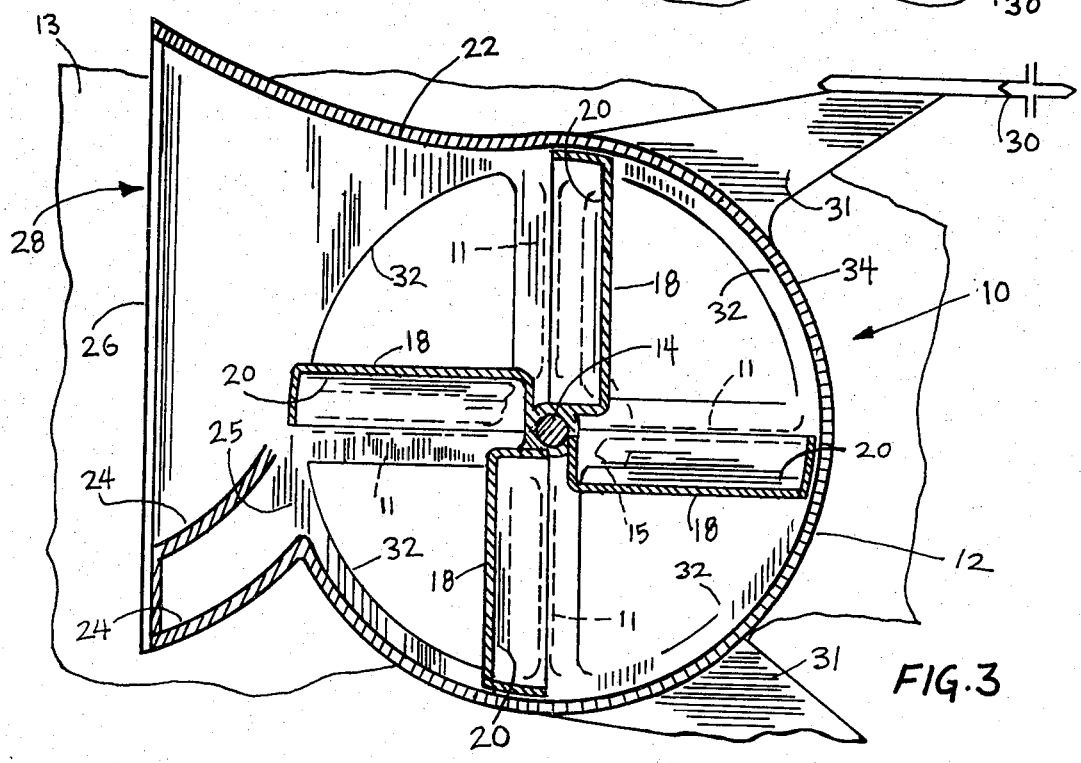
FIG. 3 is a view similar to FIG. 2, but broken away to illustrate the interior components of the fluid turbine of FIG. 1.

Referring now to the drawings in detail, wherein like numerals indicate like elements throughout the several views, the fluid turbine of the present invention is generally indicated by the numeral 10.

Fluid turbine 10 includes a substantially annular, horizontal rotor housing 12. The base of rotor housing 12 includes a plurality of support arms 11, which are rotatably mounted by a bearing structure 16 on a substantially vertical shaft 15 fixed to a supporting structure 13 (e.g., the roof of a building) in a manner well known in the art. A vertical shaft 14 extends coaxially through tubular shaft 15 and housing 12 and has its upper terminal end journalled within a bearing 17 fixed to the interior of the roof of housing 12. Connected to shaft 14 within housing 12, e.g., by welding or the like, are a plurality of rotor or impeller blades 18. The blades are curved in a scoop or bucket-like fashion and are adapted to rotate past a fluid entrance passage 20 cut in the housing 12.

Extending outwardly from the fluid entrance pasage 20 is a plate 22, a pair of curved plates 24 and a downwardly sloping plate 26, curved at its forward end, which defines a scoop 28. Plate 22 and innermost plate 24 converge towards the fluid entrance passage 20, which extends for substantially a quadrant of the annular housing 12. A second fluid entrance passage 25 is formed in housing 12 between plates 24. The scoop 28 serves to concentrate incoming fluid and to form a venturi to accelerate the fluid at the entrance passage 20 just prior to its impinging upon one of the blades 18 exposed within the quadrant of the entrance passage 20. Plates 24 also serve to bend the incoming fluid in an angular direction to impinge on a second one of the blades 18 which is disposed behind passage 25.

Extending from the opposite side of the housing 12 are a pair of spaced, vertical vanes or tail structures 30. Vanes 30 may be welded to the exterior surface of housing 12 by horizontal gussets 31 and serve to coaxially turn the housing 12 relative to the rotor blades 18 so that the fluid passages 20 and 25 are substantially normal to the direction of fluid flow. Omni-directional fluid will impinge upon vanes 30 causing them to position fluid entrance passages 20 and 25 normal to the direction of fluid flow.

The bottom or base of annular housing 12 is provided with a plurality of fluid exits or passageways 32. The top of the annular housing 12 is provided with a substantially semi-spherical dome 34. Dome 34 includes a fluid passageway 36 contiguous to fluid passageway 20. Fluid passageway 36 extends above the horizontal plane of blades 18.

By virtue of the provision of dome 34 and the auxiliary fluid passageway 36, incoming fluid will not only impinge upon the blade 18 positioned across the fluid passageway 20, but the incoming or non-deenergized fluid will be directed by the dome downwardly to impinge simultaneously on all of the rotor blades 18 within housing 12, toward the fluid exit passages 32. This is a result of the fact that the inclined side walls defining the interior of the dome 34 which are spaced above the plane of rotation of the blades 18 and extend around the rotational path of the blades 18, produce a spiral or helical flow of the incoming fluid within the dome 34 prior to impingement thereof with the blades 18. The introduction of non-deenergized fluid into all sections within the housing simultaneously serves to flush or expel deenergized fluid from between the blades out of the housing through the fluid exit passages 32. Downwardly sloping plate 26 blocks ambient fluid from passing directly beneath the fluid exit passages 32, which, in conjunction with the flushing of deenergized fluid from the interior of housing 12, creates a draft or low pressure area for accelerating movement of the blades by drawing more air through entrance passageways 20, 25 and 36 at an increased rate.

Further, when the fully energized fluid impinges simultaneously upon all of the rotor blades, increased momentum is given to each of the blades and particularly at commencement of rotation, the initial inertia of the rotor blades 18 to movement is overcome very efficiently and quickly. The dome 34 also serves to increase the pressure at the front of each rotor blade.

Figure 4:
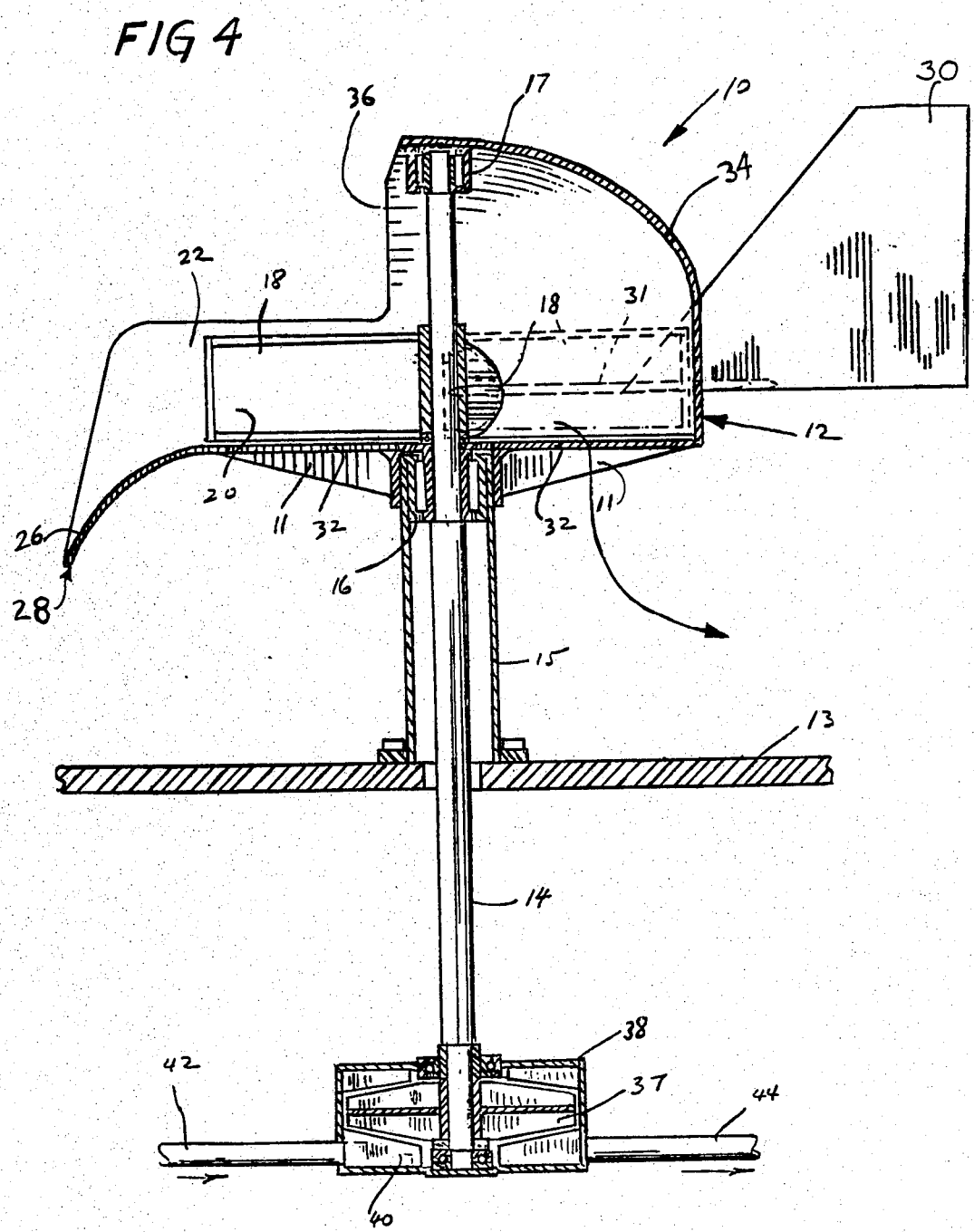
FIG. 4 is a cross sectional view taken substantially along the plane indicated by lines 4—4 of FIG. 2.

Shaft 14, which is rotated by blades 18 in the path of the impinging fluid flow, can have its free terminal end connected to the windings of an electrical generator or as illustrated in FIGS. 1 and 4, can be connected to a plurality of pump blades 37 or a heat brake encased within a housing 38 filled with fluid medium 40. The fluid medium 40 can be heated by rotation of the pump blades 37 by virtue of the turbulence and friction generated between the blades 37 and the fluid medium 40, and pumped by the blades 37 from an inlet 42 to an outlet pipe 44 wherein the fluid medium can be placed in heat exchange relation with water or the like in a home plumbing system.

It has been found that the turbine of the present invention is uniquely suited to drive all pump type loads at peak power turbine output efficiency at all ambient fluid speeds making it ideal for irrigation, air compression and heat brake, heat producing applications. Because of the turbines unique pump-like physical characteristics, its high power coefficient at all ambient fluid velocities, its low rotation rate below ambient fluid velocities and its substantially perfect cubic power profile, the turbine is better suited for matching pumping loads than prior art devices, as shown in FIG. 6.

Figure 6:
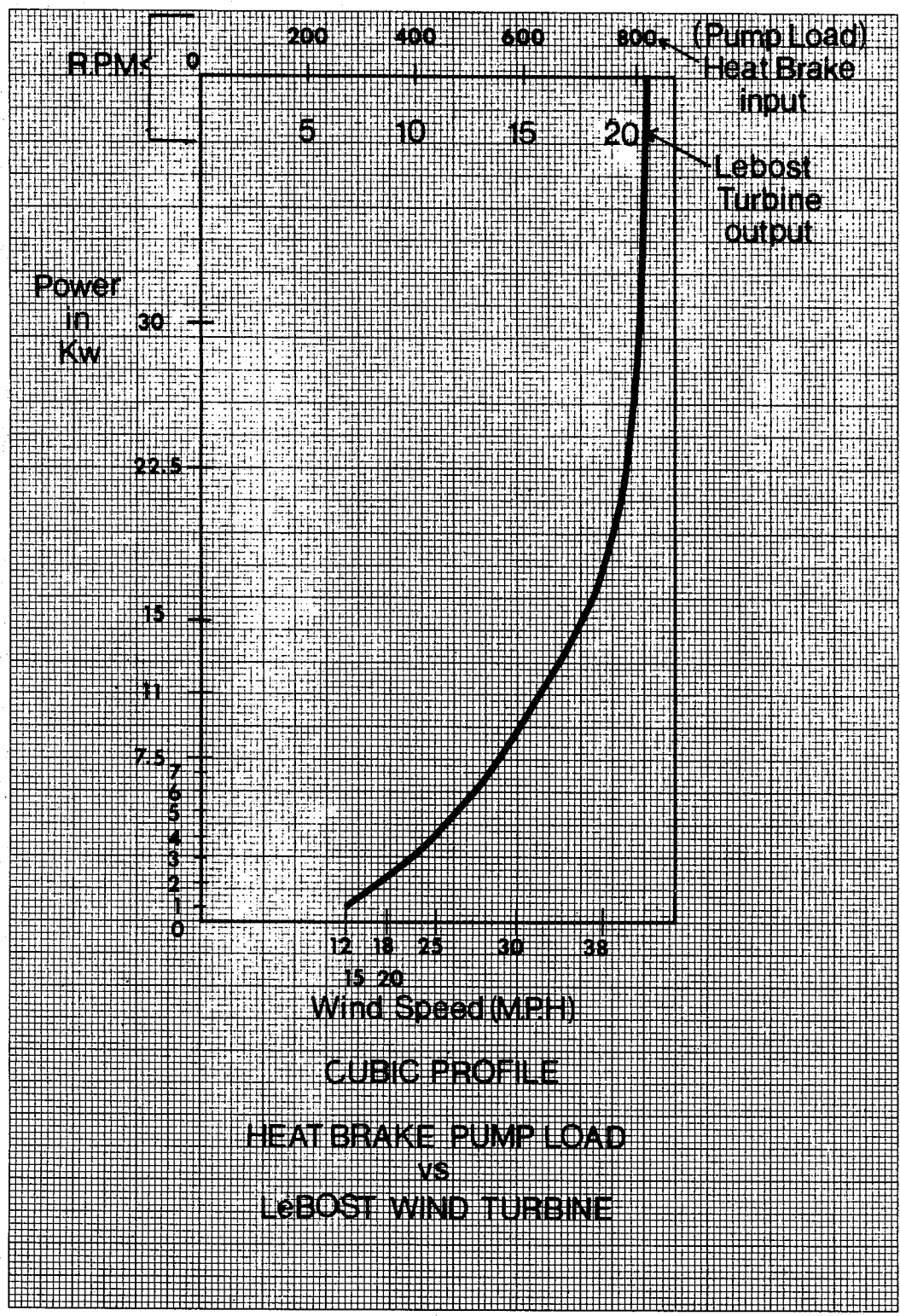
FIG. 6 is a chart comparing the power output profile of the turbine of the present invention at various fluid input velocities with the power output profile of a pump type load.

FIG. 6 is a chart in which the cubic power output of the turbine 10 has been superimposed on the power output of a heat brake manufactured by the All American Engineering Co. of Wilmington, Del. marketed under the brand name of "Water Twister". As shown in FIG. 6, the power output curve of the turbine identically matches that of the heat brake at all rpm which in turn is proportional to the velocity of the incoming fluid impinging on turbine 10.

Figure 5:
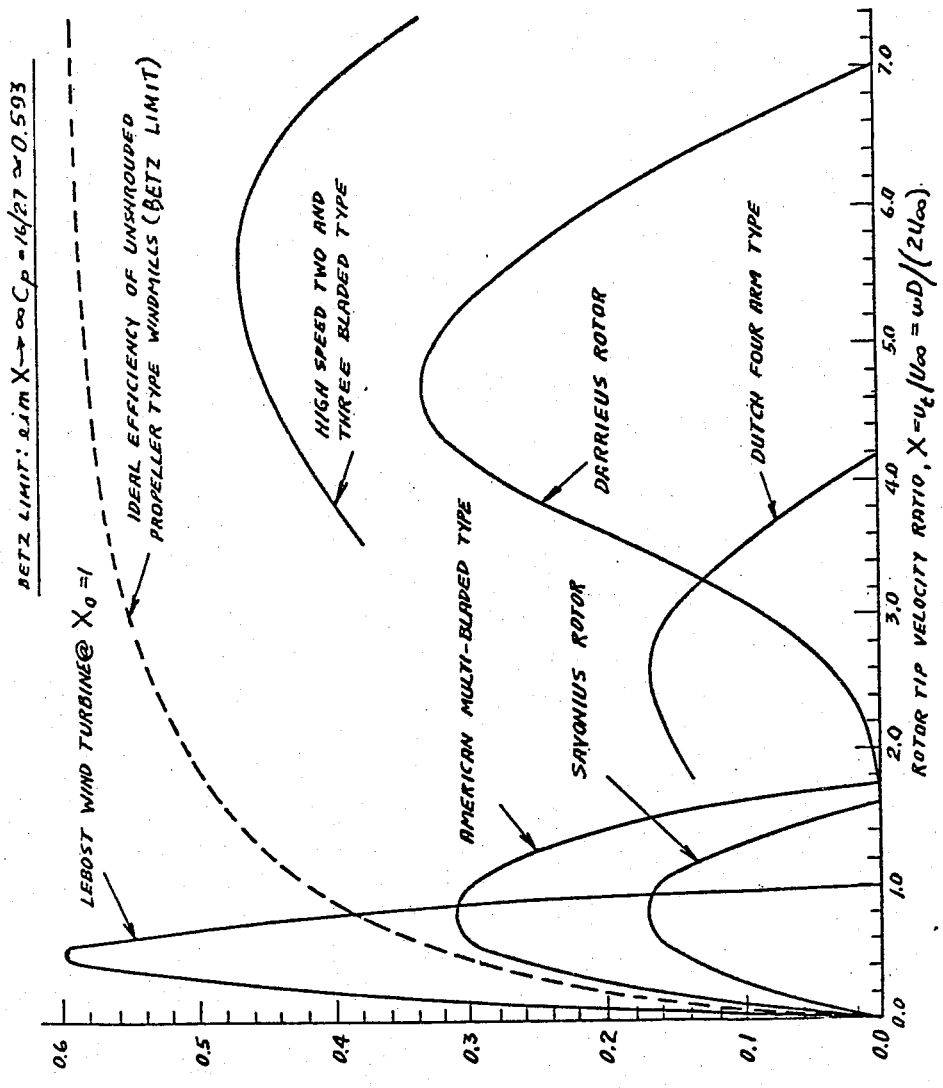
FIG. 5 is a chart comparing the power generated by the turbine of the present invention at various rotation rates relative to ambient fluid currents with other known turbine configurations.

Furthermore, as indicated in FIG. 5, the power generated by the single rotor turbine of the present invention at low speeds and wind velocity is far in excess of that that can be developed in conventional rotor systems.

FIG. 5 represents a plot of power coefficient ($C_p$) versus rotor tip velocity ratio (X) of various fluid turbines, at no load to maximum load (i.e. that point at which the machine ceases to produce a power output), $C_p$ and X are well defined terms in the art and the power coefficient $C_p$ is directly proportional to the power generated by each turbine rotor, (the power also increases at an exponential rate with fluid velocity) whereas the rotor tip velocity ratio X represents the ratio of the speed of the rotor tip to the ambient fluid current which in turn is directly proportional to the speed of rotation of the rotor.

The turbine of the present invention in ambient fluid currents (i.e., $X_0 = 1$) is indicated by the curve at the far left-hand side of the FIG. 5 and is compared first to the ideal efficiency of unshrouded propeller type windmills (indicated in dotted lines), Darrieus and Savonius rotor machines (which are vertical rotor structures, but unshrouded) and various other well known horizontal type rotor machines.

Based upon projected blade frontal area, peak power efficiency ($C_p = 0.6$) is generated by the turbine of the present invention at a rotor tip speed ratio of approximately 0.5, or when the rotor is turning at about one-half the velocity of the ambient fluid. This is approximately double that of the ideal efficiency or Betz limit of the unshrouded propeller type windmills where it occurs. Under pump type load, the turbine 10 will always operate above the Betz limit at all wind velocities. Under other type loads, as indicated in FIG. 5, turbine 10 is capable of generating a power coefficient of at least the Betz limit at a tip velocity ratio of less than the free stream fluid velocity (X = 1).

The Two and Three bladed Horizontal Axis machines and vertical Darrius rotor operate at a much higher tip speed, for a given free stream velocity than the turbine 10. In other words, the Darrieus rotor must operate at 5 times the speed of the ambient fluid or 10 times that of the present turbine to generate a peak power coefficient and power output of appoximately one-half of that achieved in the present turbine. To achieve such an output, the Darrieus rotor must spin at 250 miles per hour in a 50 miles per hour wind, while the present turbine 10 can rotate at 25 miles per hour to maintian a power output double that of the Darrieus rotor. This relatively slow rotation rate enables the turbine 10 to continue operation in high winds to deliver an exponentially increased power output, whereas the Darrieus rotor would be hard pressed to even operate without falling apart due to centrifugal forces and bearing wear.

The turbine 10 has a rotation rate characteristic in the range of the Multi-Bladed Horizontal Axis and the Savonius Vertical Axis type machines. However, the peak power coefficient of 0.6 projected for is roughly double that of the Multi-Bladed Horizontal Axis type and triple that of the Savonius rotor.

Combining these attributes, with a gyroscopically contained vertical axis rotor and space age fabricating techniques, the turbine of the present invention, is the ideal machine for power production in both populated and rural areas.

What is claimed as new is:
1. A fluid turbine for generating power when disposed in a free flowing fluid, comprising
   a rotor means including
   a housing, and
   a plurality of rotor blades within said housing adapted to rotate in a reference plane about a longitudinal axis when exposed to said free flowing fluid, said housing being provided with a first fluid entrance passage therein for allowing fluid to enter said turbine in a direction lying within said reference plane to engage at least certain ones of said rotor blades, said housing being further provided with a second fluid entrance passage therein contiguous with said first fluid entrance passage for allowing fluid to enter said turbine in another direction oblique to said reference plane, means operatively connected to said rotor blades for generating power in response to rotation of said rotor blades, and means on said housing adjacent said first and second fluid entrance passages for directing fluid from said passages in a direction lying essentially within said reference plane to impinge upon said rotor blades, and in a direction oblique to said reference plane toward said blades to impinge upon all of said rotor blades, said means on said housing including side wall means spaced from said reference plane and inclined with respect to said longitudinal axis, said side wall means extending at least approximately two quandrants around the rotational path of said rotor blades to provide a space adjacent said rotor blades for producing spiral flow of fluid within said housing and between said wall means adjacent said rotor blades.

2. A fluid turbine in accordance with claim 1 wherein said second fluid entrance passage is disposed wholly within one quadrant of said side wall means.

3. A fluid turbine in accordance with claim 1 including at least one fluid exit passage in the bottom of said housing, said fluid exit passage extending coextensive with the area swept by said rotor blades.

4. A fluid turbine in accordance with claim 1 including scoop means connected to said housing adjacent said first fluid entrance passage for concentrating fluid entering said rotor housing.

5. A fluid turbine in accordance with claim 1, wherein said housing is substantially annular in shape.

6. A fluid turbine in accordance with claim 1, including means adjacent said first fluid entrance passage for increasing the velocity of fluid flow to said housing.

7. A fluid turbine in accordance with claim 1 wherein said means operatively connected to said rotor blades for generating power in response to rotation of said rotor blades includes a vertical shaft.

8. A fluid turbine in accordance with claim 7 wherein said vertical shaft is connected to a pump type fluid brake disposed in a case filled with a fluid heat exchange medium.

9. A fluid turbine in accordance with claim 1 wherein said side wall means forms a substantially hemispherical dome.

10. A fluid turbine in accordance with claim 3 including means for creating a low pressure area in said housing adjacent said fluid exit passage to force fluid into said housing.

11. A fluid turbine in accordance with claim 10 wherein said low pressure area creating means includes:
a downwardly sloping fluid scoop connected to said housing adjacent said first fluid entrance passage, said scoop including a portion extending below the plane of the bottom of said housing to block fluid flowing past said fluid exit passage.

12. A fluid turbine for generating power when immersed in a freely flowing fluid comprising:

rotor means including a housing, and a plurality of rotor blades within said housing adapted to rotate within a reference plane when exposed to said flowing fluid, said housing being provided with a first fluid entrance passage therein for allowing fluid to enter said turbine in a direction generally lying within said reference plane, and a second fluid entrance passage therein adjacent said first fluid entrance passage and spaced from said reference plane for allowing fluid to enter said turbine in another direction oblique to said reference plane, means on said housing adjacent said first fluid entrance passage for directing fluid from said first fluid entrance passage to impinge on at least certain ones of said rotor blades in a direction essentially lying within said reference plane, said housing including a cavity adjacent said rotor blades defined by side wall means spaced from said reference plane and inclined with respect to an axis normal to said reference plane, said side wall means extending at least approximately two quadrants around the path of rotation of said rotor blades whereby to produce spiral motion of said fluid flowing in said oblique direction.

13. A fluid turbine for generating power comprising:

a single rotor provided with a housing, a set of radially extending rotor blades within said housing adapted to rotate in a single reference plane when exposed to a source of fluid, a first fluid entrance passage in said housing extending in a direction lying essentially within said reference plane, and a second fluid entrance passage spaced from said first fluid entrance passage and extending in a direction oblique to said reference plane, means connected to said rotor housing for independently rotating said housing coaxial to said rotor blades in response to omni-directional fluid flow to position said fluid entrance passage in said rotor housing normal to the direction of fluid flow, and means operatively connected to said rotor blades for generating power in response to the rotation of said rotor blades, said housing including side wall means spaced from said reference plane and inclined with respect to an axis normal to said reference plane, said side wall means extending at least 180 degrees around the path of rotation of said rotor blades whereby to produce spiral motion of fluid entering said housing through said second fluid entrance passage.

14. A fluid turbine for generating power comprising:

a single rotor, said rotor including a housing having means defining a fluid entrance passage, a set of radially extending rotor blades within said housing adapted to rotate in a reference plane about a longitudinal axis when exposed to a source of fluid, and a fluid exit passage adjacent said rotor blades and coextensive with the latter, said means defining said entrance passage extending angularly away from said reference plane and generally toward said longitudinal axis, whereby to expose said rotor blades to a portion of said fluid flowing into said housing in a direction substantially aligned with said reference plane, and to expose all of said rotor blades to another portion of said fluid flowing into said housing in a direction toward said reference plane and oblique to the latter, means connected to said rotor housing for independently rotating said housing coaxial to said rotor blades in response to omni-directional fluid flow to position said fluid entrance passage in said rotor housing normal to the direction of fluid flow, and means operatively connected to said rotor blades for generating power in response to the rotation of said rotor blades said housing including side wall means spaced from said reference plane and inclined with respect to said longitudinal axis, said side wall means extending around at least approximately two quadrants of the rotational path of said rotor blades whereby to produce spiral motion of said another portion of fluid flowing into said housing.

15. A fluid turbine in accordance with claim 14 including:

means on said housing adjacent said fluid exit passage for creating a zone of low fluid pressure adjacent said fluid exit passage.

16. A fluid turbine in accordance with claim 15 wherein said low pressure creating means comprises:

a downwardly sloping fluid scoop connected to said housing adjacent said means defining said entrance passage, said scoop including a portion extending below the plane of the bottom of said housing to block flow from said fluid source.

17. In combination:

a fluid turbine having a plurality of rotor blades adapted to rotate in a reference plane for generating power when exposed to a source of flowing fluid, said turbine including a housing provided with a first fluid entrance passage therein for allowing fluid to enter said turbine in one direction lying in said reference plane and engage at least certain ones of said rotor blades, said housing being further provided with a second fluid entrance passage for allowing fluid to enter said turbine in another direction oblique to said reference plane whereby to initially engage all of said rotor blades, said housing including side wall means spaced from said rotor blades and inclined with respect to an axis normal to said reference plane, said side wall means extending around at least approximately three quadrants of the rotational path of said rotor blades whereby to produce spiral motion of said fluid entering said second fluid entrance passage, and a pump type load driven by said turbine rotor blades at peak turbine efficiency at all input fluid velocities from said source to said turbine, said turbine having a power coefficient above the ideal efficiency for unshrouded propeller type turbines based upon projected blade frontal areas.

18. The combination of claim 17 wherein said fluid turbine further comprises:

means connected to said housing independently rotating said housing coaxial to said rotor blades in response to omni-directional fluid flow to position said first and second fluid entrance passage in said housing normal to the direction of fluid flow, and means operatively connected to said rotor blades for generating power in response to the rotation of said rotor blades.

19. The combination of claim 18 wherein said pump type load comprises:

an impeller type fluid brake connected to said power generation means of said turbine, said fluid brake being disposed in a case filled with a fluid heat exchange medium.

20. A fluid turbine for generating power when immersed in a freely flowing fluid, comprising:

rotor means including a housing having a first and second fluid entrance passage, a fluid exhaust and a plurality of rotor blades within said housing adapted to rotate in a reference plane about a longitudinal axis when exposed to said fluid flow, said first fluid entrance passage lying essentially within said reference plane, said second fluid entrance passage being spaced from said first fluid entrance passage in a direction parallel to said longitudinal axis;

means operatively connected to said rotor blades for generating power in response to rotation of said rotor blades;

means on said housing for creating a low pressure zone adjacent said fluid exhaust; and means on said housing adjacent said first and second fluid entrance passage for directing fluid from said entrance passage toward said low pressure zone and is a direction lying essentially within a reference plane to impinge upon said rotor blades, and in a substantially helical direction oblique to said reference plane toward said blades to impinge upon all of said rotor blades, said housing including side wall means spaced from said reference plane and inclined with respect to said longitudinal axis, said side wall means extending annularly at least approximately two quadrants of the rotational path of said rotor blades whereby to produce spiral motion of fluid in said housing directed toward said blades and oblique to said reference plane.

21. A fluid turbine in accordance with claim 20, wherein: said side wall means extends at least three quadrants of the rotational path of said rotor blades.

22. A fluid turbine in accordance with claim 21 wherein said side wall means form a dome shaped configuration, and said second fluid entrance passageway is in one quadrant of said configuration.

23. A fluid turbine in accordance with claim 20 including means on said housing for independently rotating the latter coaxial to said rotor blades in response to omni-directional fluid flow to position said first and second fluid entrance passage in said housing normal to the direction of fluid flow.

24. A fluid turbine in accordance with claim 20 wherein said low pressure creating means includes structure interposed in fluid flow blocking relationship between the fluid flowing toward said turbine and said fluid exhaust.

25. A fluid turbine in accordance with claim 20, including a pump type load operably coupled with said rotor blades and driven by the latter.

* * * * *